US011774345B2

United States Patent
Naruse et al.

(10) Patent No.: US 11,774,345 B2
(45) Date of Patent: Oct. 3, 2023

(54) PARTICLE DETECTION SENSOR AND PARTICLE DETECTOR

(71) Applicant: Sharp Semiconductor Innovation Corporation, Tenri (JP)

(72) Inventors: Daiki Naruse, Fukuyama (JP); Toshiya Fujiyama, Fukuyama (JP); Hirokazu Sasabe, Fukuyama (JP); Yoshifumi Masuda, Fukuyama (JP); Mitsutoshi Okami, Fukuyama (JP); Noboru Takeuchi, Fukuyama (JP)

(73) Assignee: Sharp Semiconductor Innovation Corporation, Tenri (JP)

( * ) Notice: Subject to any disclaimer, the term of this patent is extended or adjusted under 35 U.S.C. 154(b) by 69 days.

(21) Appl. No.: 17/483,622

(22) Filed: Sep. 23, 2021

(65) Prior Publication Data
US 2022/0099554 A1  Mar. 31, 2022

(30) Foreign Application Priority Data
Sep. 30, 2020  (JP) .................................. 2020-166199

(51) Int. Cl.
*G01N 15/14*  (2006.01)
*G01N 21/53*  (2006.01)

(52) U.S. Cl.
CPC ......... *G01N 15/1436* (2013.01); *G01N 21/53* (2013.01)

(58) Field of Classification Search
CPC ...................................................... G01N 21/53
USPC ......................................................... 356/338
See application file for complete search history.

(56) References Cited

U.S. PATENT DOCUMENTS 5,262,841 A * 11/1993 Blesener ................ G01N 21/53
356/336
2020/0173906 A1  6/2020 Masuda et al.

FOREIGN PATENT DOCUMENTS

| EP | 3214425 A1 | 9/2017 | |
| JP | 2002352347 A * | 12/2002 | ............. G08B 17/06 |
| JP | 3460494 B2 | 10/2003 | |
| JP | 2016090349 A | 5/2016 | |
| WO | 2020/054690 A1 | 3/2020 | |

* cited by examiner

*Primary Examiner* — Michelle M Iacoletti
*Assistant Examiner* — Omar H Nixon
(74) *Attorney, Agent, or Firm* — ScienBiziP, P.C.

(57) ABSTRACT

A detection mechanism includes a light source disposed on a substrate, a condensing lens disposed between the substrate and light emitted from the light source, and a photodetector disposed on the substrate and under the condensing lens.

12 Claims, 10 Drawing Sheets

4: SUBSTRATE
6: DETECTION MECHANISM
(PARTICLE DETECTION SENSOR)
61: LIGHT SOURCE MEMBER
611: WALL
612: GROOVE
613: LIGHT SOURCE
614: PROJECTION LENS
62: DETECTION MEMBER
621: CONDENSING LENS
622: PHOTODETECTOR
623: HOLDER
624: HOLE

4: SUBSTRATE
6: DETECTION MECHANISM
(PARTICLE DETECTION SENSOR)
621: CONDENSING LENS
622: PHOTODETECTOR

4a: SUBSTRATE
4a1: RECESS
6: DETECTION MECHANISM (PARTICLE DETECTION SENSOR)
61: LIGHT SOURCE MEMBER
62: DETECTION MEMBER
621: CONDENSING LENS
622: PHOTODETECTOR
623: HOLDER

4b: SUBSTRATE
4b1: THROUGH-HOLE
6: DETECTION MECHANISM
 (PARTICLE DETECTION SENSOR)
61: LIGHT SOURCE MEMBER
62: DETECTION MEMBER
621: CONDENSING LENS
622: PHOTODETECTOR
623: HOLDER

4b: SUBSTRATE
4b1: THROUGH-HOLE
6: DETECTION MECHANISM
(PARTICLE DETECTION SENSOR)
621: CONDENSING LENS
622: PHOTODETECTOR

1: PARTICLE DETECTOR
5: AIR-CURRENT GENERATION MECHANISM
61: LIGHT SOURCE MEMBER
611: WALL
623: HOLDER

1: PARTICLE DETECTOR

6: DETECTION MECHANISM
(PARTICLE DETECTION SENSOR)
623: HOLDER

PARTICLE DETECTION SENSOR AND PARTICLE DETECTOR

BACKGROUND

1. Field

An aspect of the present disclosure relates to a particle detection sensor and a particle detector.

2. Description of the Related Art

Examples known as a related art include a particle detection sensor that detects particles contained in a gas. For example, Japanese Unexamined Patent Application Publication No. 2016-090349 discloses a particle detection sensor that can detect particles with high accuracy. As illustrated in FIG. 4 in Japanese Unexamined Patent Application Publication No. 2016-090349, an optical system 20 in a particle detection sensor 1 includes a phototransmitter 120 and a photoreceiver 130 disposed in a detection area DA covered with a housing 10 to have their optical axes (optical axis P and optical axis Q) cross each other. The photoreceiver 130 detects particles 2 that pass the detection area DA with light output by the phototransmitter 120.

SUMMARY

In the above example of the related art, however, the phototransmitter 120 and the photoreceiver 130 are disposed on an inner surface of the housing 10 to have their optical axes cross at a predetermined angle. To implement such a structure, the particle detection sensor 1 is to have a large size, and fails to have a small size.

An aspect of the present disclosure is to provide a particle detection sensor with a small size.

To address the above problem, a particle detection sensor according to an aspect of the present disclosure is a particle detection sensor that is disposed on a substrate to detect particles in a gas. The particle detection sensor includes a light source disposed on the substrate, a condensing lens disposed between the substrate and light emitted from the light source, and a photodetector disposed under the condensing lens and on the substrate.

An aspect of the present disclosure can provide a particle detection sensor with a small size.

DESCRIPTION OF THE EMBODIMENTS

Embodiment 1

Embodiment 1 of the present disclosure will be described in detail, below.

Particle Detector 1

Figure 1:
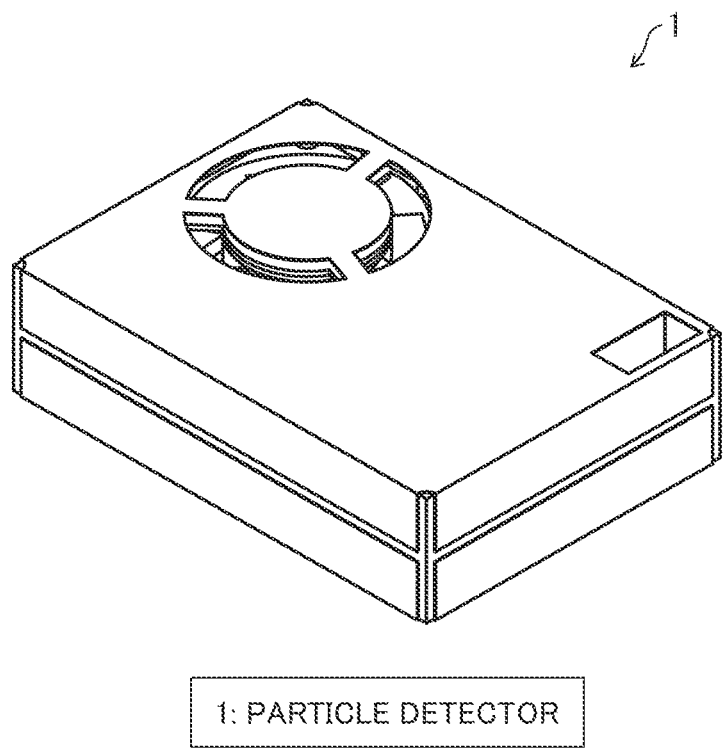
FIG. 1 is a perspective view of the appearance of a particle detector according to Embodiment 1 of the present disclosure.

FIG. 1 is a perspective view of the appearance of a particle detector 1 according to the present embodiment. The particle detector 1 is a device that detects particles in a gas.

Figure 2:
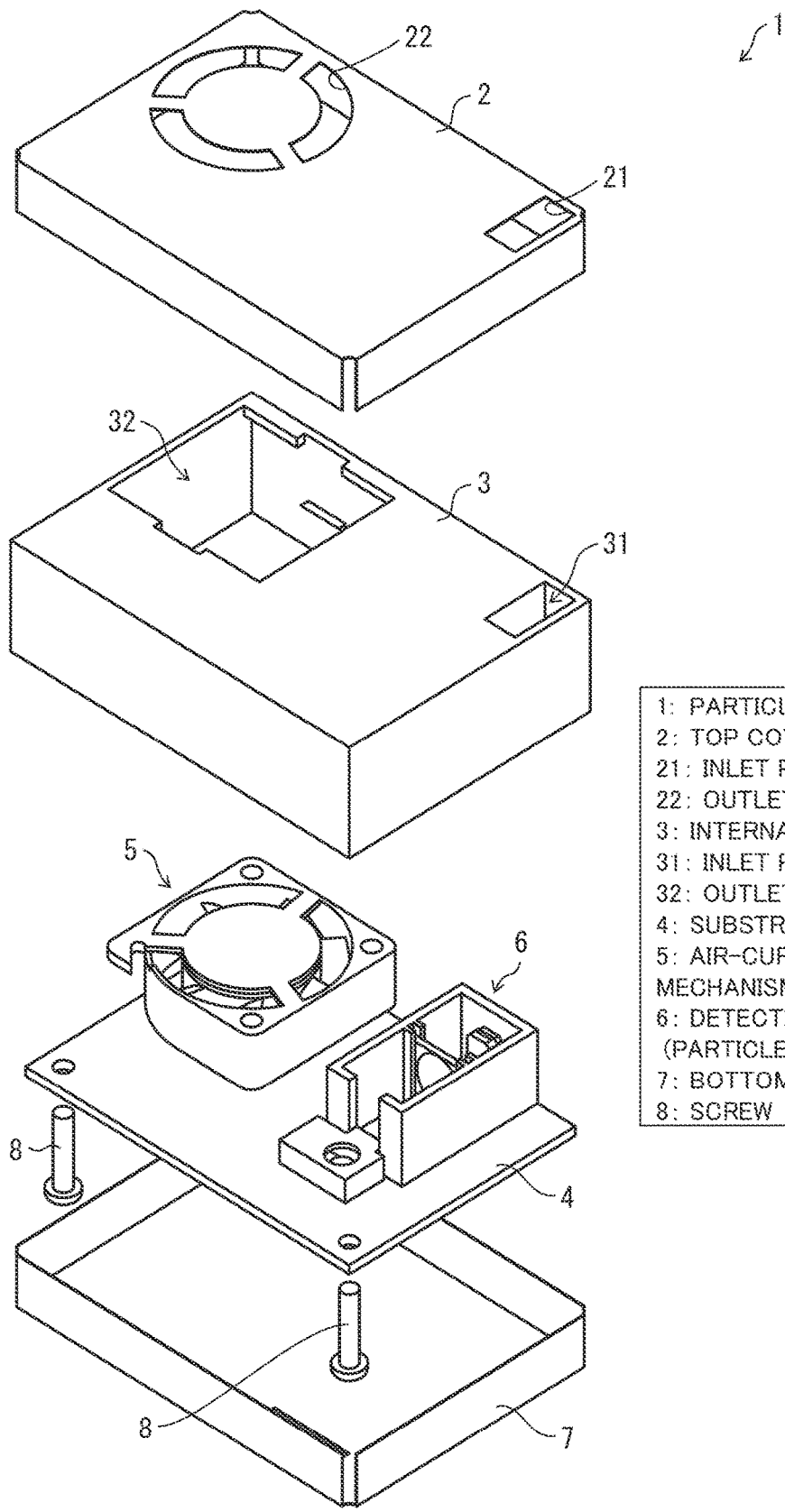
FIG. 2 is an exploded perspective view of a structure of the particle detector according to Embodiment 1 of the present disclosure.

FIG. 2 is an exploded perspective view of a structure of the particle detector 1 according to the present embodiment. As illustrated in FIG. 2, the particle detector 1 includes a top cover 2, an internal cover 3, a substrate 4, an air-current generation mechanism 5, a detection mechanism (particle detection sensor) 6, and a bottom cover 7.

The top cover 2 is an upper cover and includes an inlet port 21 and an outlet port 22. The inlet port 21 is a port through which gas outside of the particle detector 1 is taken inside. The outlet port 22 is a port through which gas inside the particle detector 1 is discharged to the outside, and has a shape corresponding to an exhaust port of the air-current generation mechanism 5.

The internal cover 3 is a cover located between (in the middle of) the top cover 2 and the bottom cover 7, and includes an inlet port 31 and an outlet port 32. The inlet port 31 includes an opening through which a gas outside of the particle detector 1 is taken inside, and a rectangular-prism-shaped inner surface that guides the gas to the detection mechanism 6. The outlet port 32 is a port through which gas inside the particle detector 1 is discharged to the outside, and has a shape corresponding to the profile of the air-current generation mechanism 5.

The substrate 4 is a bed plate receiving components including the air-current generation mechanism 5 and the detection mechanism 6. The air-current generation mechanism 5 is a mechanism that is mounted on the substrate 4 and generates an air current to cause outside gas to pass through a path 9 (refer to FIG. 3). This mechanism can take in gas outside of the particle detector 1, cause the gas to pass through itself, and discharge the gas to the outside. The air-current generation mechanism 5 includes components such as a fan, a temperature regulator, and a pressure regulator. Instead of being installed inside, the air-current generation mechanism 5 may be externally connected to the particle detector 1.

The detection mechanism 6 is a mechanism that is disposed on the substrate 4 and detects particles in gas taken in through the inlet ports 21 and 31. The detection mechanism 6 is described below in detail.

The bottom cover 7 is a lower cover. As illustrated in FIG. 2, the internal cover 3 and the bottom cover 7 cover the substrate 4, the air-current generation mechanism 5, and the detection mechanism 6. More specifically, the internal cover 3 covers components such as the air-current generation mechanism 5 and the detection mechanism 6. Screws 8 stand erect on an internal flat surface of the bottom cover 7 to support the substrate 4.

Summary of Substrate 4, Air-Current Generation Mechanism 5, and Detection Mechanism 6

Figure 3:
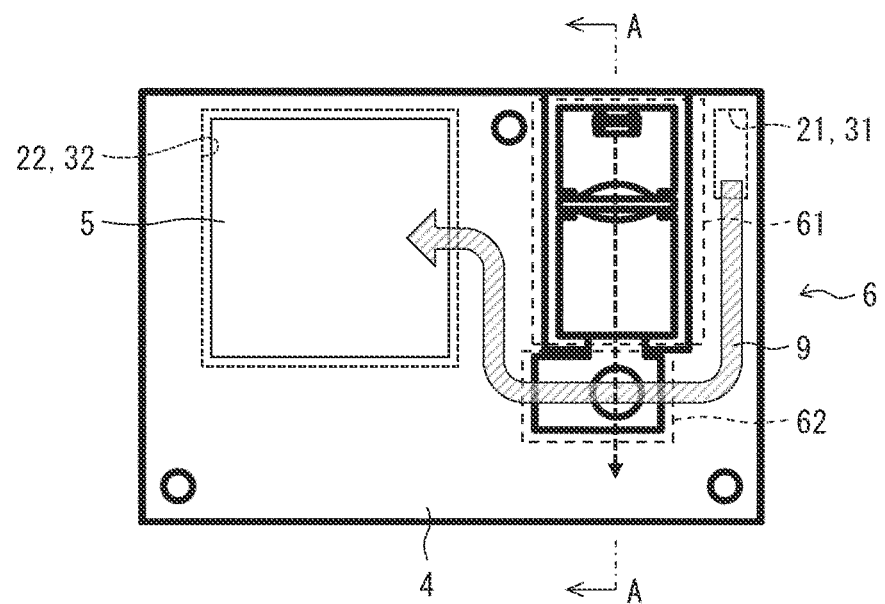
FIG. 3 is a plan view of a substrate, an air-current generation mechanism, and a detection mechanism of the particle detector according to Embodiment 1 of the present disclosure.

FIG. 3 is a plan view of the substrate 4, the air-current generation mechanism 5, and the detection mechanism 6 of the particle detector 1 according to the present embodiment. As illustrated in FIG. 3, the air-current generation mechanism 5 and the detection mechanism 6 are mounted on the substrate 4.

When rotating its fan, the air-current generation mechanism 5 generates a flow of gas (flow indicated with a hatched arrow in FIG. 3) taken in from the outside of the particle detector 1 through the inlet ports 21 and 31, passing over a detection member 62, passing through the air-current generation mechanism 5, and discharged through the outlet ports 32 and 22 to the outside of the particle detector 1.

The detection mechanism 6 includes a light source member 61 and a detection member 62. The light source member 61 is disposed parallel to the plane of the substrate 4, and emits light toward above the detection member 62 (in a direction indicated with a broken arrow in FIG. 3). The detection member 62 is disposed at a position toward which light from the light source member 61 is emitted, and detects scattering light obtained by the emitted light scattered by particles in a gas.

The particle detector 1 includes a path 9 disposed above at least the detection member 62 (condensing lens), including a space through which light emitted from the light source member 61 (light source) passes, and allowing the outside gas to pass therethrough.

In the above structure, the gas taken in from the outside of the particle detector 1 with the operation of the air-current generation mechanism 5 receives light emitted from the light source member 61 when passing above the detection member 62. At this time, particles contained in the gas scatter light from the light source member 61. The detection member 62 detects part of the scattering light. Thus, particles in the gas can be detected.

The cross-sectional view taken along line A-A corresponds to embodiments described below.

Detection Mechanism 6

Figure 4:
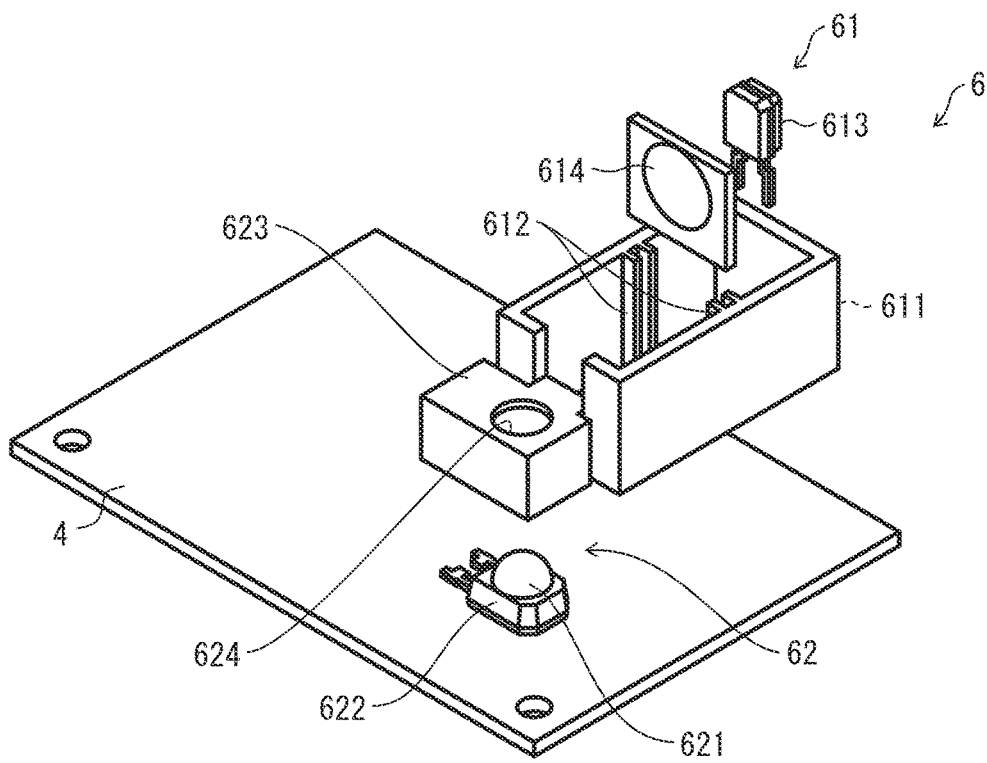
FIG. 4 is a perspective view of a structure of the detection mechanism according to Embodiment 1 of the present disclosure.

FIG. 4 is a perspective view of a structure of the detection mechanism 6 according to the present embodiment. The detection mechanism 6 includes the light source member 61 and the detection member 62.

As illustrated in FIG. 4, the light source member 61 is disposed on the substrate 4, and includes a wall 611, grooves 612, a light source 613, and a projection lens 614. The wall 611 forms a housing of the light source member 61. The grooves 612 are formed on the inner surface of the wall 611 to hold the projection lens 614 therebetween. The light source 613 is disposed on the substrate 4, and emits light toward at least the projection lens 614. The projection lens 614 is a lens to converge light emitted from the light source 613 to irradiate a portion above the detection member 62 with the light. The projection lens 614 is disposed perpendicularly to the substrate 4 while being held between the grooves 612.

The detection member 62 is disposed adjacent to the light source member 61, and includes a condensing lens 621, a photodetector 622, a holder 623, and a hole 624.

Condensing Lens 621

The condensing lens 621 is a lens that converges light received from above the condensing lens 621 and to irradiate the photodetector 622 with the light. The condensing lens 621 is disposed between the substrate 4 and light emitted from the light source 613. Specifically, the condensing lens 621 is disposed opposite the light source 613 across the projection lens 614, below the light emitted from the light source 613 and that has passed through the projection lens 614, and parallel to the substrate 4. More specifically, the condenser surface of the condensing lens 621 is disposed substantially parallel to the surface of the substrate 4.

The condensing lens 621 may be removable. The condensing lens 621 that is removable is cleanable and replaceable when degraded.

The condensing lens 621 may be spherical. The condensing lens 621 that is spherical less easily allows falling dust to adhere thereto or accumulate thereon.

Photodetector 622

Figure 5:
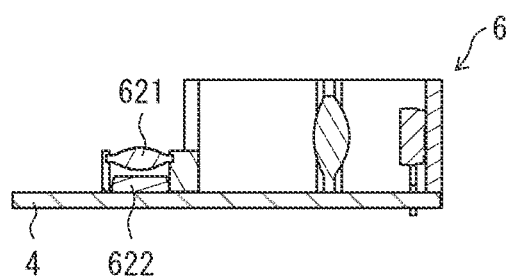
FIG. 5 is a cross-sectional view of the detection mechanism according to Embodiment 1 of the present disclosure.

The photodetector 622 detects light with which dust (particles) is irradiated when the light travels through the condensing lens 621 from above the condensing lens 621 to below the condensing lens 621. The photodetector 622 is disposed on the substrate 4 below the condensing lens 621. FIG. 5 is a cross-sectional view illustrating a cross section (cross section taken along line A-A in FIG. 3) of the detection mechanism 6 according to the present embodiment. As illustrated in FIG. 5, the condensing lens 621 and the photodetector 622 are disposed on the substrate 4.

The photodetector 622 is more likely to become dirty through continuous duty. However, in the above structure, the condensing lens 621 disposed above the photodetector 622 can protect the photodetector 622.

The condensing lens 621 and the photodetector 622 may be integrated together. In this structure, the positional relationship between the condensing lens 621 and the photodetector 622 is fixed, and thus the accuracy in particle detection is improved. Moreover, this structure eliminates the process of assembling the condensing lens 621 and the photodetector 622 together, and thus simplifies the process of manufacturing the detection mechanism 6.

Holder 623

The holder 623 is a cover covering the condensing lens 621 and the photodetector 622. The hole 624 is formed at an upper portion in the holder 623 to limit light that is to pass through the condensing lens 621.

In the above structure, providing the holder 623 can narrow light that is to pass through the condensing lens 621, and thus can reduce stray light. This structure can block light that fails to be condensed by the condensing lens 621, and thus can improve the detection accuracy. Dust accumulating on the holder 623 is less likely to enter the holder 623, and less likely to cause measurement errors. In other words, the holder 623 also serves as a cover of the condensing lens 621 and the photodetector 622.

The holder 623 may include metal. The holder 623 including metal has a shielding effect. This structure can thus reduce the effect of electromagnetic wave noise in particle detection.

Effects of Holder 623

Effects of the detection member 62 including the holder 623 will be described below.

The detection member 62 can be fixed. This can improve the positioning accuracy, prevent displacement during manufacturing, and reduce shakes (vibrations) in operation. This structure can also clearly distinguish the detection member 62 and a gas flow path (path 9), and thus can form a flow path through which gas flows smoothly.

The directivity of the detection member 62 can be further limited. For example, narrowing the hole 624 further than the directivity (for example, ±60°) of the condensing lens 621 and the photodetector 622 enables further narrowing of the directivity. This structure can also block stray light that is incident on the photodetector 622 from a side surface without passing through the condensing lens 621. Forming a recess in the upper surface of the holder 623 can narrow light from the light source 613 to only the directivity of the vertical plane. Here, the directivity of a horizontal plane may be as wide as possible.

The holder 623 has a ground potential to have a shielding effect. This structure can thus reduce the effect of the disturbance noise.

The condensing lens 621 that does not protrude from the hole 624 of the holder 623 is not directly irradiated with light. Thus, stray light can be reduced.

When, on the other hand, the condensing lens 621 protrudes from the hole 624 of the holder 623, the directivity of the condensing lens 621 is not limited by the hole 624 of the holder 623 (that is, the viewing angle of the condensing lens 621 can be widened). In this structure, the condensing lens 621 closes up the hole 624, and thus prevents accumulation of dust (and, reduction of amount of light received) in the holder 623.

Structure Without Holder 623

The detection member 62 may exclude the holder 623. This structure limits the particle detection area not by the holder 623 but by the condensing lens 621, and thus can soften the attachment accuracy. Examples of the attachment accuracy include the position and the angle of the light source 613 and the positional relationship between the holder 623 and the photodetector 622.

Method for Detecting Particle Density

The substrate 4 of the detection mechanism 6 also includes a controller (not illustrated). The controller obtains signals from the photodetector 622, and detects the particle density in a gas. The method for detecting the particle density has some examples. For example, the controller may detect the particle density by counting the light scattered from the particles. The controller may detect the particle density at each particle diameter by counting light scattered from the particles at each appropriate peak-value range. Alternatively, the controller may detect the particle density by averaging the received signals of the light scattered from particles.

Effects of Embodiment 1

According to the present embodiment, the light source member 61 and the detection member 62 have a simple positional relationship. Thus, the particle detector 1 and the detection mechanism 6 can have a small size. In the detection member 62, the condensing lens 621 is disposed above the photodetector 622, and thus can protect the photodetector 622. When the condensing lens 621 is removable, the condensing lens 621 facilitates its maintenance. The condensing lens 621 is disposed parallel to the substrate 4 not to detect signals outside of the detection area.

Embodiment 2

Embodiment 2 of the present disclosure will be described below. For illustration convenience, components having the same functions as those described in Embodiment 1 are denoted with the same reference signs without being described redundantly.

Figure 6:
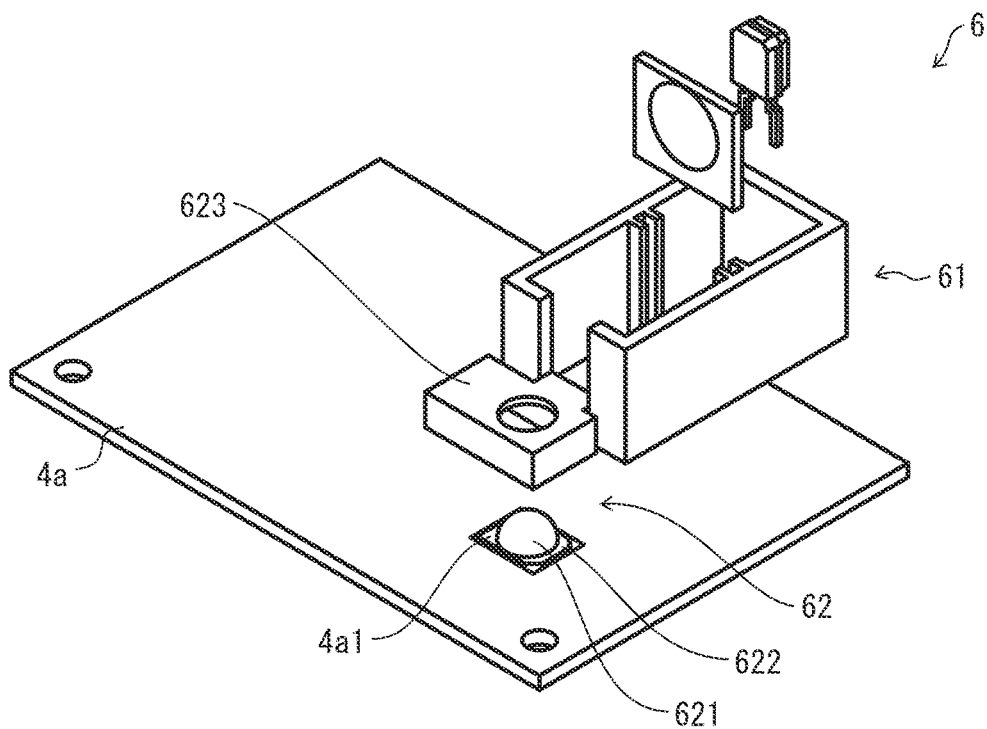
FIG. 6 is a perspective view of a structure of a detection mechanism according to Embodiment 2 of the present disclosure.

FIG. 6 is a perspective view of a structure of a detection mechanism 6 according to the present embodiment. The detection mechanism 6 includes the light source member 61 and the detection member 62.

Figure 7:
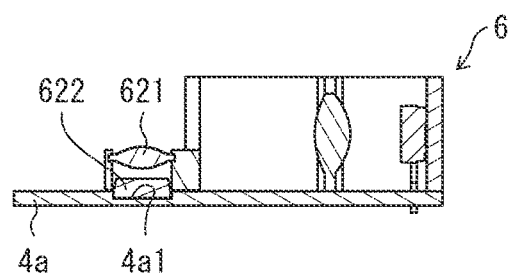
FIG. 7 is a cross-sectional view of the detection mechanism according to Embodiment 2 of the present disclosure.

FIG. 7 is a cross-sectional view illustrating a cross section (cross section taken along line A-A in FIG. 3) of the detection mechanism 6 according to the present embodiment.

As illustrated in FIGS. 6 and 7, a substrate 4a has a recess 4a1. The photodetector 622 is embedded in the recess 4a1. The photodetector 622 may be a surface-mount photodetector or another type of photodetector.

Effects of Embodiment 2

In the present embodiment, the photodetector 622 is embedded in the recess 4a1 of the substrate 4a. Thus, the particle detector 1 and the detection mechanism 6 can be thinned. This structure can secure a gas flow path. In addition, the photodetector 622 is securely fixed, and thus the positional accuracy of the photodetector 622 can be improved. Although the structure does not include the holder 623, the upper protrusion protruding from the substrate 4a is smaller, and thus less likely to allow dust to accumulate thereon.

In addition, adding a spacer can flexibly adjust the height of the photodetector 622.

Embodiment 3

Embodiment 3 of the present disclosure will be described below. For illustration convenience, components having the same functions as those described in Embodiments 1 and 2 are denoted with the same reference signs without being described redundantly.

Figure 8:
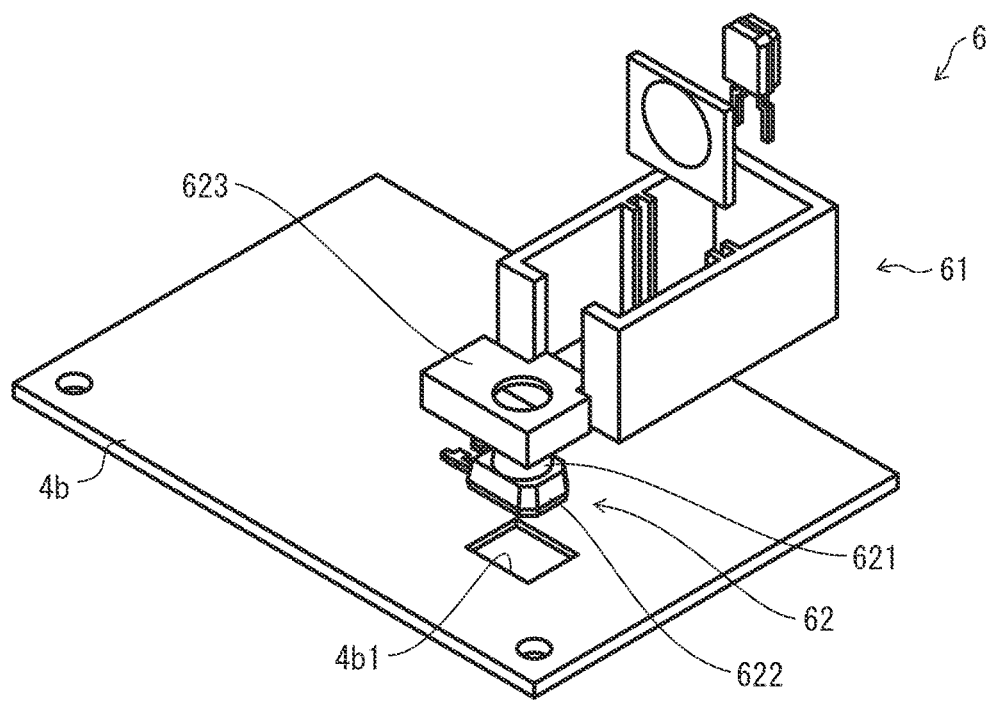
FIG. 8 is a perspective view of a structure of a detection mechanism according to Embodiment 3 of the present disclosure.

FIG. 8 is a perspective view of a structure of a detection mechanism 6 according to the present embodiment. The detection mechanism 6 includes a light source member 61 and a detection member 62.

Figure 9:
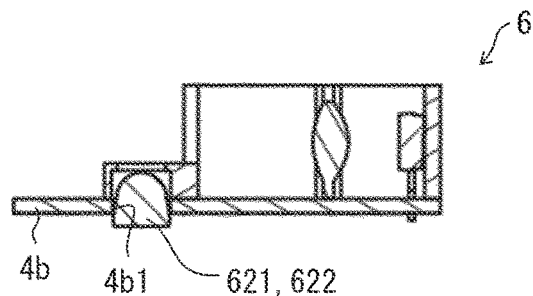
FIG. 9 is a cross-sectional view of the detection mechanism according to Embodiment 3 of the present disclosure.

FIG. 9 is a cross-sectional view illustrating a cross section (cross section taken along line A-A in FIG. 3) of the detection mechanism 6 according to the present embodiment.

As illustrated in FIGS. 8 and 9, a substrate 4b has a through-hole 4b1. The photodetector 622 extends through the through-hole 4b1. The photodetector 622 may be a surface-mount photodetector or another type of photodetector.

Effects of Embodiment 3

According to the present embodiment, the photodetector 622 extends through the through-hole 4b1 in the substrate 4b. Thus, the particle detector 1 and the detection mechanism 6 can be further thinned. The gas flow path can thus be secured. In addition, the photodetector 622 can be reliably fixed, and the positional accuracy of the photodetector 622 can thus be improved. The photodetector 622 is guided into the through-hole 4b1 in the substrate 4b, and can thus be easily and accurately mounted.

Although having no holder 623, the upward protrusion protruding from the substrate 4b has its size reduced, and is thus less likely to allow dust to accumulate thereon. This structure allows a lead wire of the photodetector 622 to be drawn out from below the substrate 4b, and facilitates electrical connection to be flexible.

In the manufacturing process, the photodetector 622 may be bonded to the bottom side of the substrate 4b, and only the condensing lens 621 may be protruded from the through-hole 4b1. This structure enables an attachment of the photodetector 622 of a lead type, and can improve the productivity. The photodetector 622 of a lead type includes a lead wire, and the lead wire and the bottom surface of the substrate 4b are soldered. Thus, a package including the photodetector 622 that is not a surface-mount photodetector can be mounted.

FIG. 9 illustrates a structure where the condensing lens 621 and the photodetector 622 are integrated, but the condensing lens 621 and the photodetector 622 may not be integrated together as needed. The structure where the photodetector 622 and the condensing lens 621 are integrated can thin the detection mechanism 6 further than the structure where the photodetector 622 and the condensing lens 621 are not integrated.

Embodiment 4

Embodiment 4 of the present disclosure will be described below. For illustration convenience, components having the same functions as those described in Embodiments 1 to 3 are denoted with the same reference signs without being described redundantly.

Figure 10:
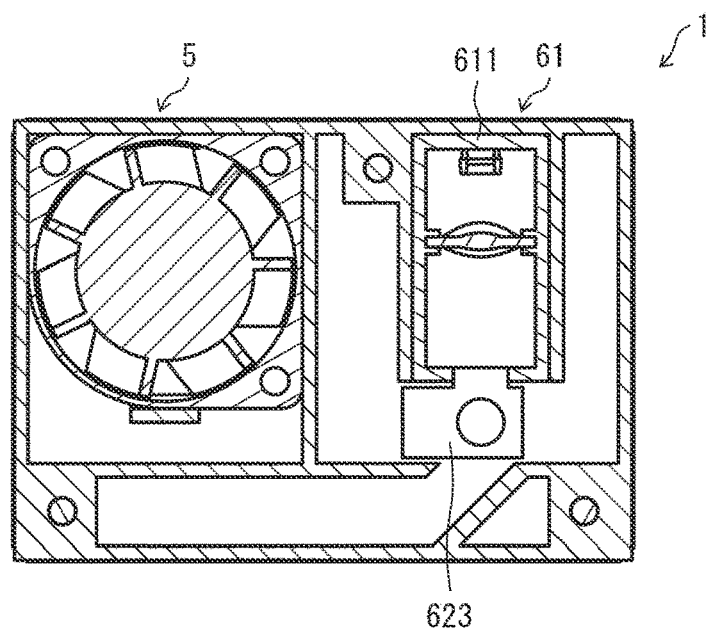
FIG. 10 is a cross-sectional view of a particle detector according to Embodiment 4 of the present disclosure.

FIG. 10 is a cross-sectional view illustrating a horizontal cross section of a particle detector 1 according to the present embodiment.

Figure 11:
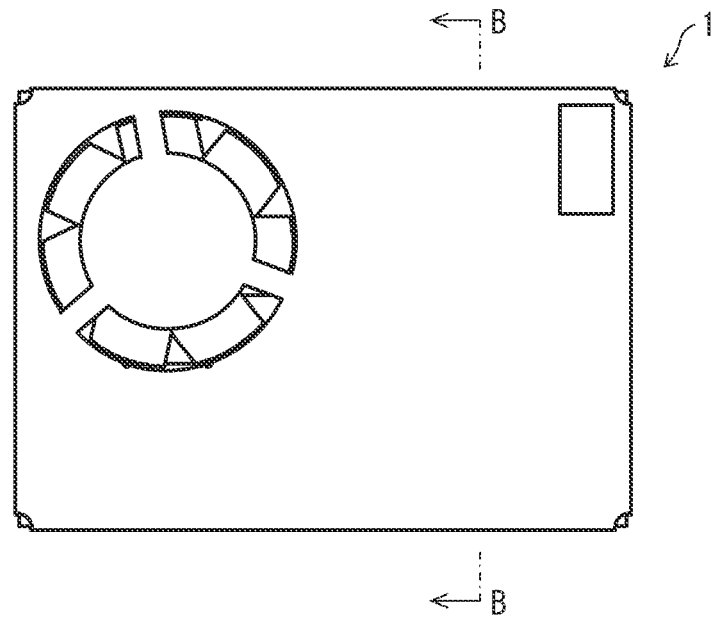
FIG. 11 is a plan view of the particle detector according to Embodiment 4 of the present disclosure.

FIG. 11 is a plan view of the particle detector 1 according to the present embodiment.

Figure 12:
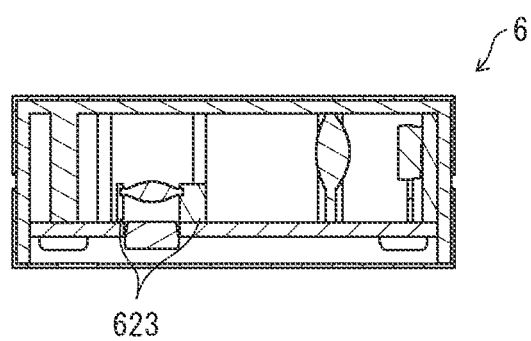
FIG. 12 is a cross-sectional view of a detection mechanism according to Embodiment 4 of the present disclosure.

FIG. 12 is a cross-sectional view of a cross section (cross section taken along line B-B in FIG. 11) of the detection mechanism 6 according to the present embodiment.

For example, as illustrated in FIG. 12, the upper portion of the holder 623 may be omitted. Omitting the upper portion of the holder 623 simplifies the structure and facilitates the maintenance. In addition, omitting the upper portion widens the viewing angle of the photodetector 622, and widens the detection range (area) of the scattering light.

Subsequently, as illustrated in FIG. 10, a wall of the air-current generation mechanism 5, the wall 611 of the light source member 61, and the holder 623 have different heights. More specifically, the holder 623 is lower than the wall of the air-current generation mechanism 5 and the wall 611 of the light source member 61. This structure forms a gas flow path (path 9), and implements a smooth gas flow. This structure can also reduce scattering light (stray light).

The periphery of the photodetector 622 may be covered with a conductive resin or sheet metal. This structure can reduce the effect of extraneous noise.

Summarization

A particle sensor according to a first aspect of the present disclosure is a particle detection sensor that is disposed on a substrate to detect particles in a gas. The particle detection sensor includes a light source member disposed on the substrate, a condensing lens disposed between the substrate and light emitted from the light source member, and a photodetector disposed on the substrate and under the condensing lens.

In the above structure, components are disposed on the substrate, and thus the particle detection sensor can have a small size.

A particle detection sensor according to a second aspect of the present disclosure depends on the first aspect, wherein the substrate may have a through-hole, and the photodetector may extend through the through-hole.

In the above structure, the photodetector extends through the through-hole in the substrate. Thus, the particle detection sensor can be further thinned.

A particle detection sensor according to a third aspect of the present disclosure depends on the first aspect, wherein the substrate may have a recess, and the photodetector may be embedded in the recess.

In the above structure, the photodetector is embedded in the recess in the substrate. Thus, the particle detection sensor can be thinned.

A particle detection sensor according to a fourth aspect of the present disclosure depends on any of the first to third aspects, wherein the condensing lens and the photodetector may be integrated together.

In the above aspect, a positional relationship between the condensing lens and the photodetector is fixed, and thus the accuracy in particle detection can be improved.

A particle detection sensor according to a fifth aspect of the present disclosure depends on any of the first to fourth aspects, wherein the condensing lens may be removable.

In the above aspect, the condensing lens is removable, and thus cleanable and replaceable when degraded.

A particle detection sensor according to a sixth aspect of the present disclosure depends on any of the first to fifth aspects, wherein the condensing lens may be spherical.

In the above structure, the condensing lens is spherical, and thus less likely to allow falling dust to adhere thereto or accumulate thereon.

A particle detection sensor according to a seventh aspect of the present disclosure depends on any of the first to sixth aspects, and may further include a holder that covers the condensing lens and the photodetector.

The above structure can narrow light that passes through the condensing lens, and thus can reduce stray light.

A particle detection sensor according to an eighth aspect of the present disclosure depends on the seventh aspect, wherein the holder may include metal.

In the above structure, the holder including metal has a shielding effect. Thus, the above structure can reduce electromagnetic wave noise in particle detection.

A particle detection sensor according to a ninth aspect of the present disclosure depends on any of the first to eighth aspects, and may further include a projection lens disposed perpendicularly to the substrate, wherein the condensing lens may be disposed opposite the light source member across the projection lens, and under light that is emitted from the light source member and that has passed through the projection lens.

In the above structure, the particle detection sensor has a small size, and can more efficiently detect light.

A particle detection sensor according to a tenth aspect of the present disclosure depends on any of the first to ninth aspects, and may further include a path that is disposed above at least the condensing lens, that includes a space through which the light passes, and that allows the gas to pass therethrough.

The above structure allows the gas to pass above the condensing lens, and thus can more efficiently detect light.

A particle detection sensor according to an eleventh aspect of the present disclosure is a particle detection sensor disposed on a substrate to detect particles in a gas. The particle detection sensor includes a light source member disposed on the substrate, a projection lens disposed perpendicularly to the substrate, a condensing lens disposed parallel to the substrate, opposite the light source member across the projection lens, and under light that is emitted from the light source member and that has passed through the projection lens, a photodetector disposed on the substrate and under the condensing lens, and a path that is disposed above at least the condensing lens, that includes a space through which the light passes, and that allows the gas to pass therethrough.

In the above structure, components are disposed on the substrate, and thus the particle detection sensor can have a small size.

A particle detector according to a twelfth aspect of the present disclosure includes the particle detection sensor according to any of the first to eleventh aspects, and an air-current generation mechanism that generates an air current to cause the gas to pass through the path.

In the above structure, the particle detector can have a small size.

An aspect of the present disclosure is not limited to any of the above described embodiments, and may be changed in various manners within the scope of claims. Embodiments obtained by appropriately combining any of technical devices disclosed in different embodiments are also included in the technical scope of an aspect of the present disclosure. Combinations of the technical devices disclosed in different embodiments can form new technical features.

While there have been described what are at present considered to be certain embodiments of the disclosure, it will be understood that various modifications may be made thereto, and it is intended that the appended claims cover all such modifications as fall within the true spirit and scope of the disclosure.

The present disclosure contains subject matter related to that disclosed in Japanese Priority Patent Application JP 2020-166199 filed in the Japan Patent Office on Sep. 30, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A particle detection sensor that is disposed on a substrate to detect particles in a gas, the particle detection sensor comprising:
   a substrate
   a light source member disposed on the substrate and configured to emit light in a light path, the light path being parallel to the substrate and towards a flow path through which gas containing the particles flows;
   a condensing lens attached to the substrate and disposed between the substrate and the light path, the condensing lens being configured to transmit light scattered by the particles; and
   a photodetector disposed on the substrate and under the condensing lens, the photodetector being configured to detect light transmitted through the condensing lens; wherein
   the condensing lens is disposed parallel to the substrate.

2. The particle detection sensor according to claim 1, wherein the substrate has a through-hole, and
   wherein the photodetector extends through the through-hole.

3. The particle detection sensor according to claim 1, wherein the substrate has a recess, and
   wherein the photodetector is embedded in the recess.

4. The particle detection sensor according to claim 1, wherein the condensing lens and the photodetector are integrated together.

5. The particle detection sensor according to claim 1, wherein the condensing lens is removable.

6. The particle detection sensor according to claim 1, wherein the condensing lens is spherical.

7. The particle detection sensor according to claim 1, further comprising a holder that covers the condensing lens and the photodetector.

8. The particle detection sensor according to claim 7, wherein the holder includes metal.

9. The particle detection sensor according to claim 1, further comprising a projection lens disposed perpendicularly to the substrate,
   wherein the condensing lens is disposed opposite to the light source member across the projection lens, and under light that is emitted from the light source member and that has passed through the projection lens.

10. The particle detection sensor according to claim 1, further comprising a path disposed above at least the condensing lens, the path defines the light path and the gas path.

11. A particle detector, comprising:
    the particle detection sensor according to claim 10; and
    an air-current generation mechanism that generates an air current to cause the gas to flow through the path.

12. A particle detection sensor disposed on a substrate to detect particles in a gas, the particle detection sensor comprising:
    a light source member disposed on the substrate;
    a projection lens disposed perpendicularly to the substrate;
    a condensing lens disposed parallel to the substrate, opposite to the light source member across the projection lens, and the condensing lens being on a light path from the light source member to the projection lens;
    a photodetector disposed on the substrate, under the condensing lens, and on the light path of light emitted from the light source member; and
    a path disposed above at least the condensing lens, the path defining the light path, and a gas path of the gas containing the particles.

* * * * *